United States Patent
Behn et al.

[15] 3,670,378
[45] June 20, 1972

[54] PROCESS FOR THE PRODUCTION OF CAPACITORS

[72] Inventors: Reinhard Behn, Munich; Heinrich Gottlob, Regensburg; Hans Hald; Gerhard Hoyler, both of Munich; Hartmut Kessler, Regensburg, all of Germany

[73] Assignee: Siemens Aktiengesellschaft, Berlin and Munich, Germany

[22] Filed: June 18, 1969

[21] Appl. No.: 834,405

[30] Foreign Application Priority Data

June 24, 1968 Germany..................P 17 64 541.9

[52] U.S. Cl..............................................................29/25.42
[51] Int. Cl. ..............................................................H01g 13/00
[58] Field of Search....................29/25.41, 25.42; 242/56.1

[56] References Cited

UNITED STATES PATENTS

| | | |
|---|---|---|
| 2,731,706 | 1/1956 | Grouse ................................29/25.42 |
| 2,731,705 | 1/1956 | Grouse ................................29/25.42 |
| 3,454,999 | 7/1968 | Koyanagi et al....................29/25.42 |
| 3,304,475 | 2/1967 | Gowen et al........................29/25.42 |

Primary Examiner—John F. Campbell
Assistant Examiner—D. M. Heist
Attorney—Hill, Sherman, Meroni, Gross & Simpson

[57] ABSTRACT

Capacitors are manufactured by winding a number of parent or master windings one upon another, coating the windings in common with metal on the face sides thereof by a metal spraying process and separating them one from the other. In one instance, the master windings are separated one from the other by the provision of inactive layers which project at the face sides or ends of the windings to prevent contacting of the layers of the windings during metal spraying. In another embodiment the interlayers are dimensioned as wide as the capacitively active layers and the face-side zones of the interlayers are masked during the application of the metallic layers. In yet another embodiment the inactive layers are completely metal coated and separation is provided by sawing or cutting in the zone of the interlayers. In this case, the interlayers remain on the finished partial capacitor as cover layers.

18 Claims, 6 Drawing Figures

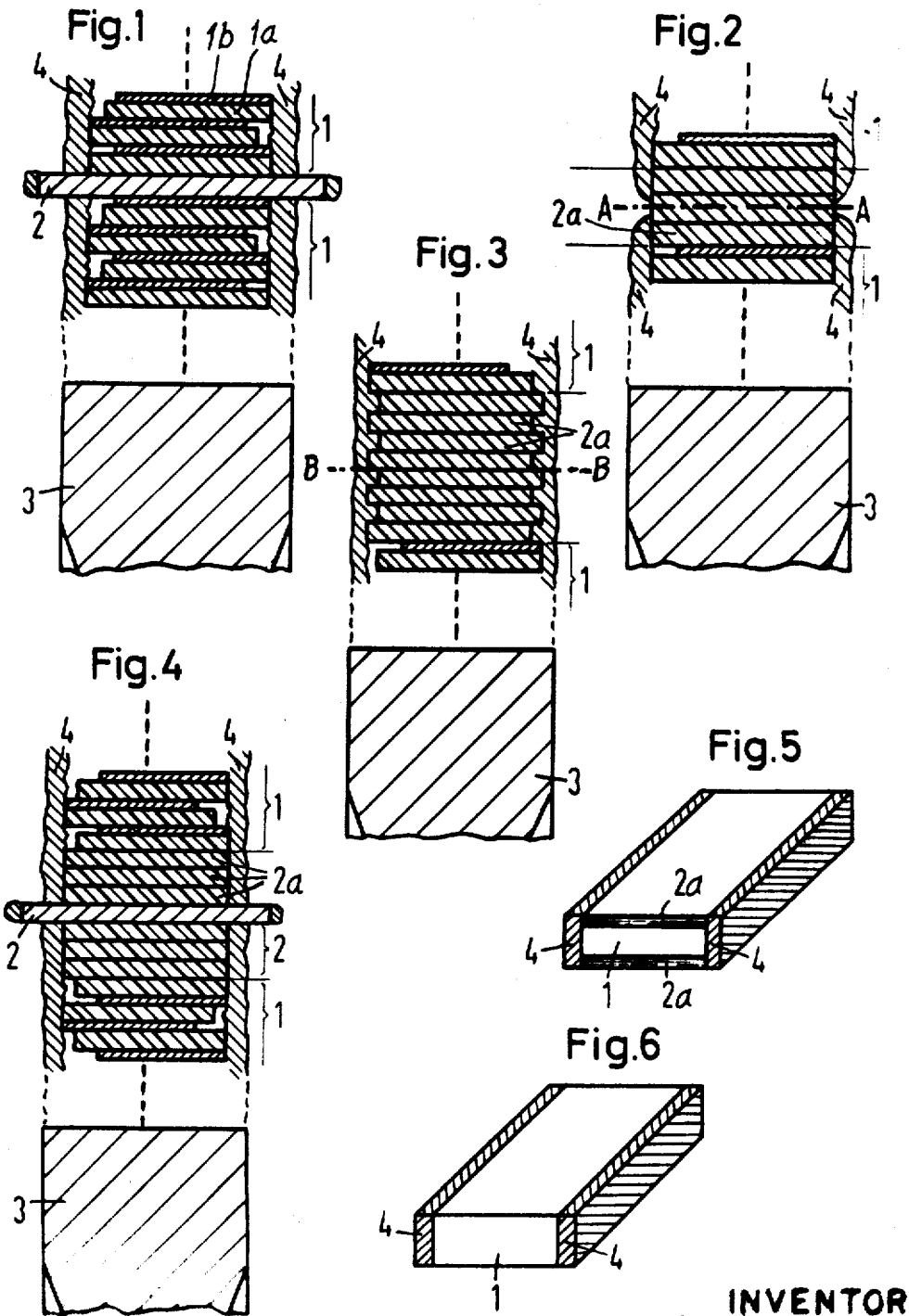

PROCESS FOR THE PRODUCTION OF CAPACITORS

BACKGROUND OF THE INVENTION

1. Field of the Invention

This invention relates to processes for the production of capacitors, and in particular to processes for the production of stacked or layer type capacitors.

2. Description of the Prior Art

The prior art includes processes for producing stack or layer type capacitors as is demonstrated by German Pat. No. 892,321 and U.S. Pat. No. 2,731,706. In such a process a parent or master winding includes a large foil pack from which the capacitors are separated by cuts perpendicular to the foil plane and in the foil plane. Since capacitors employ very thin foils, it is technologically virtually unfeasable to provide separating cuts in the foil plane or parallel to the tangential direction of the periphery of the parent winding without, in the process, damaging several layers. Particularly difficulties arise when the foil surfaces are not planes, but are in the form of a cylindrical body formed by winding the layers on a large drum.

The metal coverings of the capacitor comprise, in particular, very thin layers of metal deposited upon a substrate. Difficulties arise in separating the parent or master layers into individual capacitors in that cutting the parent capacitor first in a radial direction and then in a direction tangential to the cylindrical surfaces which surround the drum concentrically. The difficulty lies mainly in the exact separation in the directions which lie tangentially to the cylindrical surfaces, since a cutting operation, such as for example, sawing or milling, must necessarily be formed exactly within the confines of these surfaces through end-face contact metal and foil of the parent winding that has been applied by Shoop metal spraying. It has been proven that the capacitors separated off heretofore are very sensitive to damages of their foil layers. For example, in the outermost of the layers lying adjacent to the cut surfaces there nearly always occurs short circuits because, with the relatively crude cutting systems available, holes are torn into the sensitive foils which are 2 to 20 $\mu$ in thickness. There also occurs an increase in the loss factor in production because the outer layers are partially torn off by the contacting of metal between layers.

It is also known that from the above type of process capacitors whose thickness and width amounts to a multiple of the later to be formed individual capacitors, are separated perpendicularly and parallel to the winding of the layers into individual capacitors in, for example slab, block or circular sector forms. Thereupon, then, these individual capacitors are to be contacted by spraying of metal onto their surfaces, in which operation care must be taken by relatively expensive measures such as interrupted metalizing of the foils of the parent winding, so that in each case only the coverings of one plurality are covered by one of the sprayed-on metal layers. Capacitors provided by such methods present grave fundamental defects including the disadvantage that the surface of the slab-formed sawed pieces to be contacted by the metal spraying process do not have any offsetting of two successively following dielectric layers such as is usual in capacitor winding technology. This offsetting, however, is necessary for a faultless contacting of the vaporized metal coverings. These and other difficulties are reasons why the foregoing method has not become known in any practical form of execution.

The prior art also recognizes the production of capacitors on a drum in such a way that two dielectric bands, offset against one another, with coverings vaporized on in a vacuum, are wound on a drum until the thickness of the later to be formed individual capacitors is reached. The face surfaces are then provided by a metal spraying process with a metal layer which in each case connects the coverings of one plurality. Thereupon, this output or starting capacitor is divided by cuts perpendicular to the winding layers of the individual capacitors. This process has a considerable disadvantage in that it is very uneconomical. For example, if it is desired to produce capacitance values in a range of 0.01 to 1.0 $\mu$F, then, with the use of ordinary plastics, there is wound a dielectric width with a thickness of 3 to 10 $\mu$ and with widths from 8 to 13 mm into a starting winding of about 5 mm thickness. The spraying of metal onto such narrow rings, however, is uneconomical, since the jet diameter of usual metal spraying devices amounts to several centimeters, thereby providing a considerable over-spray and attendant waste of metal.

SUMMARY OF THE INVENTION

According to the invention, capacitively inactive interlayers are provided between a number of dielectric layers forming the parent or master capacitor from which individual capacitors are produced. The interlayers are arranged such that the several parent capacitors separated by the interlayers are laminated one over another and that the parent capacitors are divided in the zone of the capacitively inactive interlayers and in a direction perpendicular to the interlayers.

There is first obtained a large stack of a number of parent capacitors lying one over another and separated by the interlayers. The superposed layers are then end-face coated with a contact metal by moving the long stack, for example, past a metal spraying installation. The sub-division of the parent capacitor into the individual partial capacitors takes place in the direction and in the zone of the interlayers and in a direction perpendicular thereto. There is then provided slab or block form construction elements.

When the parent capacitors are produced on a drum with a large diameter the capacitively inactive interlayers are wound along their width in such a manner that on the drum there are wound several parent windings one over another in the radial direction with these windings being separated by interlayer windings. The sub-dividing takes place in the peripheral direction of the parent capacitors in the zone of the capacitively inactive layers.

The parent capacitors on the drum are wound not only of capacitively active foils, but between a certain number of dielectrically active foil layers and coverings there is wound a number of non-dielectrically active foil layers of metal or plastic. The non-dielectrically or non-capacitively active zones are of such a width that the known separating processes used, under some circumstances known, do not have a detrimental effect on the dielectrically active foils, for example, but a shadow effect during the coating of the end faces with a contact metal.

It is now possible, according to the present invention, to wind a number of parent windings, say 10 to 20, one upon another and coat these windings in common with metal on the face sides thereof by the Shoop metal spraying process and to later separate them one from the other without any of the aforementioned disadvantages occurring.

Four different types of separation have proven suitable in practicing the present invention. First, the separation can be facilitated, after completion of the winding of a parent winding or the stacking of a parent stack, advantageously by providing that the means interposed between the parent capacitor layers lying one against the other are capacitively inactive interlayers which project at the face sides (ends) of the stack. The separating layers are dimensioned to project from the ends, preferably about 1.5 mm. Greater projection of the edge of the interlayers gives rise to a danger of shadow effect during the face-side metal spraying wherein metal coverage would be inadequate or incomplete. The coverings adjacent to the interlayers are then not contacted by the provision of the entending interlayers. The separating layers have to have a certain stiffness and are nevertheless usually wound on the drum. In addition, the interlayers must lie snugly against the parent capacitors and it is through these separating interlayers and the contact layer applied as a whole to the face side of the parent capacitors, that the capacitors are sub-divided. It is advantageous if there is no adherence of the contact metal to the separating layers. Parent capacitors wound one upon another and provided in such a manner with interlayers or separating layers which are separated after face-side coating with contact metal, for example by two or more saw cuts in a direction perpendicular to the separating layers, in the case of a parent winding in the radial direction, are divided into two or more segments. It must be possible to sever the interlayers easily and severance of these layers provide suitable metal bands, for example of 0.05 to 0.1 mm in thickness. In particular, an unhardened band steel fulfills all of the requirements at this point.

In a second separating process, the interlayers are dimensioned as wide as the capacitively active layers. The face-side zone of the interlayers is masked off entirely or partially by blinds in the applying of the face-side contact metals. In the case of a partial masking, the capacitive layers adjacent to the interlayers are completely covered by the contact metals. The particular masking is therefore chosen in such a way that only the middle zone of the face-side surfaces of the interlayers is masked off and thereby remains free of receiving the contact metal. Separation can be accomplished in simple manner, for example, by breaking apart in this middle, metal-free zone of the interlayers.

In another separating process, the interlayers are likewise dimensioned as wide as the capacitively active layers. Then, however, the capacitively inactive layers are completely covered with metal at the same time as the active layers by the Shoop metal spraying process. The separation is made, for example, by sawing or cutting in the zone of the interlayers, and the interlayers remain in the finished partial capacitor as cover layers.

In the last few separating methods presented, the interlayers are preferred to be plastic foils and in the first-mentioned separation method the interlayers are preferred to be of metal.

An extraordinarily advantageous method of providing the separation between active layers resides in a separating process in which neutral interlayers of plastic are introduced between the capacitively active layers with a width of the capacitive active layers. In a middle zone of these interlayers, in which layer separation or severance is to occur, there is laid in a separating layer projecting over both face sides, as is described in the first separating process. The face sides are then completely sprayed by the metal spraying process with a contact metal. Through the provision of the separating layers there takes place a sub-division of the face-side contact metal layers. In separating the stack into partial capacitances, the individual stack capacitors can easily be released from the separating layers. There are then eliminated the additional separating cuts parallel to the capacitor layers and the neutral interlayers, which are also covered by the face-side contact metal layers, remain on the finished layer capacitor as cover layers. Further, a shadow effect of the separating layers and the applying of the contact metals to the face sides does not have a disadvantageous effect on the capacitively active layers. The usual metals for the Shoop metal spraying process are zinc, aluminum, copper, brass, tin, lead and alloys of these metals.

BRIEF DESCRIPTION OF THE DRAWINGS

Other objects, features and advantages of the invention, its organization and operation will be readily apparent from the following description of preferred embodiments thereof, taken in conjunction with the accompanying drawing, although variations and modifications thereof may be effected without departing from the spirit and scope of the novel concepts of the disclosure, and in which:

FIG. 1 is a fragmentary cross-sectional view illustrating a first embodiment of the invention wherein capacitively active layers are wound on a drum and separated by separating interlayers which extend or project at the face sides of the windings;

FIG. 2 is a fragmentary cross-sectional illustration of a second embodiment of the invention wherein capacitively active layers are wound upon a drum so as to be separated by interlayers and which interlayers are masked to prevent complete metal coverage thereof during metal coating of the face ends;

FIG. 3 is a fragmentary cross-sectional view of another embodiment of the invention wherein the capacitively active windings are placed on a drum with interlayer material provided to maintain a separation of the active layers and through which separation is later provided;

FIG. 4 is a fragmentary cross-sectional view according to another embodiment of the invention wherein capacitively active layers are wound on a drum and wherein there is provided between the capacitively active layers neutral interlayers separated by separating layers which project beyond the face sides of the remaining layers; and FIGS. 5 and 6 illustrate individual capacitor elements which are the products of processes of the present invention.

DESCRIPTION OF THE PREFERRED EMBODIMENTS

In FIGS. 1 to 4, the dielectrically active layers 1 of the parent or master capacitors and the separating interlayers or inlays or separating layers not capacitively active are wound onto a drum or circular plate 3. The capacitively active layers of the parent capacitors are composite layers including a substrate layer 1a and a film layer 1b. The capacitively active layers of the parent capacitors are wound offset to one another so that there are covered by the contact layers 4 on the face-side in each case only coverings to be given like polarities. The face contact layers 4 can be applied by known metal spraying processes to the parent winding lying one over another while still situated on the drum.

For the separation of the parent capacitors into individual capacitors there can be employed the four methods described above. In correspondence to FIG. 1, there are wound along and between the capacitively active layers 1, which are covered by the contact metal 4 at the face-side edges, separating layers 2 as interlayers. The separating layers 2 preferably consist of metal as mentioned above and project at the face sides. The projecting edge sub-divides the face contact layers 4 in such a way that in each case a parent winding is covered with a cohesive contact metal layer and each of the parent windings, or multiple windings, are separated from each other and the metal layers 4 are interrupted by the separating layers 2. Since the contact layers are interrupted by the separating layers, separation may be accomplished by merely detaching the parent layers from the separating layers. The spraying direction of the metal in the provision of contacting layers 4 and the width of the projecting edge are compatible with one another in such a way that the capacitively active layers joining the separating layers are covered by the contact metal layer 4.

According to FIG. 2, the area of the interlayers or inlays 2a is at least partially covered by rotating or fixed narrow circular blinds or masks. After the application of the contact layer 4, one or more radial separating cuts are executed through the superpositioned parent capacitors so that the wound-on parent capacitors can be detached from the circular plate as circular segments. The resulting arcuate or circular segments of the parent capacitors can be divided along the zones of the inlays, for example by simple tearing apart or cutting, along the section line A—A into narrower segments. Here it can certainly occur that a foil does not adhere to a single angular cut-out and is partially torn out. This and other foils not adhering securely are then torn off entirely which does not involve any damage to the capacitor, since it is not a matter of capacitively effective foils. The narrow angular cut-outs are now further subdivided into shorter sections in each case according to the desired capacitance. In this process again outer layers can be detached, which are not held or are only partially held by the metal coating 4. The zone width of the inlays 2a and the areas not provided with the metal coating 4 necessarily must be attuned to one another in such a way that the capacitively active layers are completely contacted by the metal layer 4, so that no capacitance is lost due to foil loss and that no capacitance is lost due to incomplete or partial contact. The covering off or masking is best accomplished by the means that the interlayers or inlays are completely masked only in the zone of the severance line A—A in which the layer separating surface lies. Then the capacitively acting layers adjacent to the interlayers are insured of a 100 percent covering and contacting by the metal layer 4. It is also possible to coat the interlayers completely with metal, and then to free the zone of the separating surface of metal again by milling or other steps of metal removal.

An especially critical effect is that of imprecise transitions between metal-sprayed zones and zones not sprayed with metal when the process is employing very thin layers in that a very large number of such layers would lie in this transition zone.

These difficulties can be avoided in the third separating process as follows. The entire annular winding is sprayed throughout with a metal coating layer 4 in correspondence to FIG. 3 and thereupon in the zone of the capacitively inactive inlays 2a, are separated by cutting sawing or the like along a parting line B—B. Turning now to FIG. 4, there is represented a fourth separating process wherein at about the middle zone of the interlayers or inlays 2a, which can be unmetalized plastic foils, there is wound along therewith a separating layer 2. The face contact metal layers 4 applied over the entire face sides thereby cover both the capacitively active layers 1 of the superposed parent capacitors and the neutral inlays 2a. It has been shown that up to 20 parent capacitors can be stacked in this manner. The separating layers 2 project at the face sides and are of the same nature as the separating layers 2 illustrated in FIG. 1 and employed in the first separating process. The division of the parent capacitors in the peripheral direction, of course, takes place at the separating layers 2, to thereby eliminate any additional cutting operation in the peripheral direction.

In the processes of the invention as described with reference to FIGS. 2, 3 and 4 there result individual capacitors in a form which is illustrated in FIG. 5, capacitors whose cover layers 2a are formed of the capacitively inactive inlays. In a separating process in accordance with the stacked superposition of FIG. 1 there results capacitors corresponding to the apparatus illustrated in FIg. 6, capacitors without cover layers. The cover foils which are yielded from the capacitively inactive layers have primarily the character of electrically insulating enveloping foils, such have been long known in the capacitor art. Neither the voltage-conducting metal layers 4 nor the cut surfaces with their metal coating edges are insulated on the exterior by cover layers.

The cover layers, however, present an important advantage. Stack capacitors or layer capacitors which are produced according to the drum winding processes or by stacking of capacitor bands one upon another into a parent stack capacitor 10, to have a decline in capacitance because of their geometry to a scaling off of the individual foils, especially in the case of a temperature-conditioned shrinkage of thermoplastic dielectric foils or expansion or mechanical stress. The mechanical strength of thin layer capacitors or stack capacitors is not, moreover, very great against twisting or bending. The capacitively inactive cover foils can now be produced in such a way that they simultaneously provide the layer capacitor with a strong mechanical support and also press the foils against one another.

In order to increase this supporting or bracing effect of the thin foils, there must be achieved a clamping of the layers with the face-side contact metal layers 4. To realize this increased strength, the layers are wound offset from one another or foils of differing width are employed or the foils are provided with oblique edge cuts.

The coefficient of expansion of the inlay layers should, insofar as possible, be similar to that of the capacitively active foils, since otherwise, particularly in the transition zone between two types of foils, there can occur mechanical strains which endanger the contacting between the metal layers 4 and the thin metal coatings 1b. It is best to employ the same material and the same type of foils for both the cover foils and the dielectric foils.

An additional securing of the capacitors and particularly of the inlays is achieved by pressing the layers at higher temperatures. The cover layers then adhere very strongly to one another and require the rigidity of a thick plate in the total thickness of all of the inlay layers. EXpediently, this pressing is achieved by a tempering process on the circular plate, that is the parent capacitors remain on the drum at this time. For stretched foils, the foils are shrunk at a higher temperature pressed securely upon one another while unstretched foils are pressed by increasing winding pull or contact pressure for the inlay foil. Here it was also determined that the inlay foils adhere more strongly to one another than the capacitively active foils, which is probably due to the stronger adhesion of plastic to plastic than plastic to metal.

In order to avoid further tensions which arise in the winding interior during the face-side spraying on of metal by the Shoop process in consequence of the heat load there arising, and for the elimination of air inclusions between the capacitively active layers, the parent capacitor can be tempered. This is of importance especially if the dielectric foils are thermoplastics. The tempering can be carried out before or after metal spraying.

An additional strengthening of the inlay foils can be provided, if, for example, in the winding process, solvents or adhesives are introduced between the inlay foils, so that these adhere into a strong plate. It has proved advantageous for the cover foils, which can be cast foils, to still contain solvent residues of about 0.25 percent.

In the utilization of very thin inlay foils, particular care must be taken to provide a sufficient adhesion of the foils to one another, so that the outermost foil layers will have sufficient rigidity.

If the capacitor does not receive any additional protective envelope, the inlay foil should, insofar as possible, be stable with respect to the usual cleaning agents employed in the manufacture of apparatus including the capacitor. Furthermore, it is desirable that the capacitors likewise satisfy the condition fulfilled by the capacitive foils with respect to tension and weathering strength (temperature and moisture).

The following has proven to be favorable examples of execution;

1. Polycarbonate foils of 2 to 20 $\mu$ in thickness are utilized as the dielectric layers and polycarbonate foils of 40 to 100 $\mu$ in thickness, which are tempered, are employed as the inlay foils. 2. Polyethylene terephthalate foils of 2.5 to 20 $\mu$ in thickness are utilized for the dielectric layers and polyethylene terephthalate foils of 40 to 100 $\mu$ in thickness, which if need be, are tempered and employed for the inlay layers.

What is claimed is:

1. A process for the production of capacitors comprising the steps of:

forming a plurality of elongate capacitor bodies by winding for each capacitor body alternate metallic and dielectric films on a drum;

comtemporaneously winding separating layers between the elongate capacitor bodies to form a parent winding having alternate layers of capacitor bodies and separating layers;

applying a metallic coating to the edges of the parent winding to connect the metallic films of the individual elongate capacitor bodies; and severing the parent winding at a plurality of locations perpendicular to and in the peripheral direction of the separating layers to form a plurality of individual capacitor bodies.

2. The process according to claim 1, wherein the winding of the separating layers is further defined as disposing the separating layers beyond the edges of the elongate capacitor bodies to prevent contact of the metallic films of different elongate capacitor bodies upon the application of the metallic coating.

3. The process according to claim 1, comprising the step of tempering the parent winding on the drum to compensate for tensions arising during the winding process.

4. The process according to claim 1, wherein at least one separating layer between each elongate capacitor body is a metal band and the step of separating along the separating layers includes removing the metal bands.

5. The process according to claim 1, wherein the step of forming the elongate capacitor bodies includes winding a heat-shrinkable plastic material for the dielectric films, and comprising the step of applying heat to the parent winding to shrink the heat shrinkable material.

6. The process according to claim 5, comprising the step of applying pressure to the heated parent winding.

7. The process according to claim 5, comprising the step of strengthening the parent winding by providing separating layers having about 0.25 percent solvent residue to increase adherence therebetween.

8. The process according to claim 1, comprising the step of masking the separating layers prior to the step of applying a metallic coating.

9. A process for the production of capacitors comprising the steps of:
forming a plurality of elongate capacitor bodies by winding for each body alternate metallic and dielectric films on a drum;
contemporaneously winding separating layers of steel bands between the elongate capacitor bodies to form a parent winding of alternate layers of capacitor bodies and steel bands;
applying a metallic coating to the edges of the parent winding to connect the metallic films of the individual elongate capacitor bodies; and
severing the parent winding into a plurality of individual capacitor bodies by dividing the parent winding at the steel bands and perpendicular to the steel bands.

10. The process according to claim 1, wherein the step of winding separating layers is further defined as winding separating layers of equal width as that of the dielectric films, the step of applying a metallic coating is further defined as completely covering the edges of the parent winding with a metallic coating, and the step of severing the parent winding includes the step of sawing in the range of the separating layers.

11. The process according to claim 1, wherein the step of winding separating layers is further defined as winding separating layers of equal width as that of the dielectric films, the step of applying a metallic coating is further defined as completely covering the edges of the parent winding with a metallic coating, and the step of severing is further defined to include the step of manually separating the individual condensers along the separating layers.

12. A process according to claim 1, wherein the step of winding separating layers is further defined as winding for each separating layer a plurality of separating layers in a superposed configuration of first and second layers which are equal in width to the width of said dielectric films and in-between said first and second layers winding a third layer of a width greater than that of the dielectric films to prevent contact of the metallic films of different capacitor bodies upon the application of the metallic coating.

13. A process according to claim 4, wherein the step of winding a separating layer as a metal band is further defined as winding a separating layer of unhardened band steel having a width of 0.05–0.1 mm.

14. A process according to claim 1, wherein the step of winding separating layers is further defined as winding separating layers and extending the same approximately 1.5 mm beyond the edges of the capacitor bodies.

15. A process according to claim 1, wherein the non-metallic layers are made of plastic material and further comprising the steps of heating the parent winding and pressing the parent winding on the drum at an increased temperature to firm the plastic layers.

16. A process according to claim 1, including the step of applying a bonding agent between the films and layers.

17. A process according to claim 1, wherein the steps of winding are further defined as winding the dielectric films and their superposed metallic films so that adjacent dielectric and metallic films are offset from each other.

18. The process according to claim 1, wherein the non-metallic layers and foils are provided from plastic material, and comprising the step of prior to winding cutting oblique edges on the plastic films and layers to provide an offset effect when wound.

* * * * *